US011448777B2

(12) United States Patent
Stein

(10) Patent No.: US 11,448,777 B2
(45) Date of Patent: Sep. 20, 2022

(54) METHOD AND DEVICE FOR THE MEASUREMENT OF HIGH DOSE RATES OF IONIZING RADIATION

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 12 days.

(21) Appl. No.: 17/091,249

(22) Filed: Nov. 6, 2020

(65) Prior Publication Data

US 2021/0055429 A1     Feb. 25, 2021

Related U.S. Application Data

(63) Continuation of application No. PCT/EP2019/061977, filed on May 9, 2019.

(30) Foreign Application Priority Data

May 9, 2018   (EP) ..................... 18171669

(51) Int. Cl.
   *G01T 1/02*    (2006.01)
   *G01T 1/20*    (2006.01)
   *G01T 1/40*    (2006.01)

(52) U.S. Cl.
   CPC ............ *G01T 1/023* (2013.01); *G01T 1/2018* (2013.01); *G01T 1/20184* (2020.05); *G01T 1/40* (2013.01)

(58) Field of Classification Search
   CPC ....... G01T 1/023; G01T 1/20184; G01T 1/40; G01T 1/2018
   See application file for complete search history.

(56) References Cited

U.S. PATENT DOCUMENTS

| 9,269,552 B2 | 2/2016 | Steiner et al. | |
| 2006/0081786 A1* | 4/2006 | Berthold | G01T 1/20 250/370.11 |

(Continued)

FOREIGN PATENT DOCUMENTS

| JP | 2002-357692 A | 12/2002 |
| JP | 2002357692 A | 12/2002 |

(Continued)

OTHER PUBLICATIONS

International Search Report for corresponding International Application No. PCT/EP2019/061977 dated Jul. 17, 2019.

(Continued)

*Primary Examiner* — David P Porta
*Assistant Examiner* — Jeremy S Valentiner
(74) *Attorney, Agent, or Firm* — Myers Wolin, LLC

(57) ABSTRACT

A method is provided for determining the dose rate $\dot{H}$ of nuclear radiation field, namely a gamma radiation field, with a radiation detection system (RDS), comprising a scintillator, a photodetector, an amplifier and a pulse measurement electronics. The pulse measurement electronics includes a sampling analog to digital converter, where the nuclear radiation deposes at least some of its energy in the scintillator, thereby producing excited states in the scintillation material, with the excited states decaying thereafter under emission of photons with a decay time $\tau$. Photons are absorbed by the photodetector under emission of electrons, those electrons forming a current pulse, said current pulse being amplified so that the resulting current signal can be processed further in order to determine the charge of the pulse measured.

12 Claims, 2 Drawing Sheets

(56) References Cited

U.S. PATENT DOCUMENTS

| 2006/0126776 | A1* | 6/2006 | Izumi | G01T 1/17 |
| | | | | 376/255 |
| 2014/0061488 | A1 | 3/2014 | Sato et al. | |
| 2014/0151549 | A1* | 6/2014 | Steiner | H01J 49/025 |
| | | | | 250/288 |
| 2017/0227659 | A1 | 8/2017 | Stein | |

FOREIGN PATENT DOCUMENTS

| JP | 5819024 B1 * | 11/2015 | G01T 1/023 |
| WO | WO-2016066185 A1 * | 5/2016 | G01T 1/2018 |

OTHER PUBLICATIONS

Communication pursuant to Article 94(3) EPC issued by the European Patent Office for European Patent Application No. 18 171 669.7-1001, dated Dec. 1, 2021.

\* cited by examiner

METHOD AND DEVICE FOR THE MEASUREMENT OF HIGH DOSE RATES OF IONIZING RADIATION

CROSS REFERENCE TO RELATED APPLICATIONS

This application is a continuation of International Application No. PCT/EP2019/061977, filed on May 9, 2019, which takes priority from European Application No. 18171669.7, filed on May 9, 2018, the contents of each of which are incorporated by reference herein.

TECHNICAL FIELD

The invention relates to a method and device for the measurement of high dose rates of ionizing radiation, namely gamma radiation, with a radiation detection system (RDS) comprising a scintillator, a photodetector, an amplifier and a current digitizing circuit for scintillation pulse measurement (pulse measurement electronics).

BACKGROUND

The measurement of dose rates $\dot{H}$ is especially important in environments where human beings are present. The dose rate is a measure for the quantity, i.e. the total energy of nuclear radiation being absorbed by human tissue. As the absorption of ionizing radiation, including gamma radiation, is not only determined by the size of the target, but also by the amount of interaction between said radiation and the target, the composition of the target, here the scintillator material, is an issue. Said amount of interaction is generally dependent from the energy of the radiation, whereas this energy dependence varies with the material of the target. Therefore and as long as the target—for example scintillator material of a RDS—does not provide for the same interaction properties as human tissue, it is not sufficient to measure the total energy absorbed and number of interactions per seconds in the detector, caused by said gamma radiation.

It has to be mentioned also that the interaction does vary with the type of radiation in addition. More specifically, there is a substantial difference between alpha-, beta-gamma- and neutron-radiation induced energy deposition in the target, just to mention the most prominent types of radiation. As this invention deals with gamma radiation detectors only, it is not, at least not in this context, necessary to distinguish further.

When it comes to the measurement of the dose rate of a gamma radiation field, it is possible to use ionization chambers, Geiger-Müller-counters, or scintillator based measurement devices.

Scintillator based dose rate measurement devices are known in the prior art. They usually comprise a scintillator material which interacts with gamma radiation, said gamma radiation, like other ionizing radiation, producing exited states in said scintillator material, those excited states then decaying with a decay time $\tau$ under the emission of light, i.e. photons. The amount of light emitted is proportional to the energy deposed in the scintillator by the radiation.

In order to further process this information, a photodetector is connected to the scintillator, absorbing the photons and emitting a number of electrons, that number again being proportional to the amount of light absorbed, i.e. the energy deposed in the scintillator material. Those electrons form an extremely weak electric current which needs to be substantially amplified by an amplifier, being connected to the photodetector. The output signal of said amplifier may then be processed further by electronic means, thereby allowing, among other things, for the determination of the energy deposed by the gamma radiation in the scintillator material.

For many applications, it is an advantage to use inorganic materials like NaI(Tl) crystals, as they comprise of atoms with a high Z, therefore being able to absorb more gamma radiation including gamma radiation with higher energies, as the photoeffect is the predominant nuclear reaction here. Especially when it comes to spectroscopic devices where a good energy resolution is decisive, scintillator material is mostly made from inorganic crystals.

However, those inorganic materials are not tissue equivalent ideal scintillators, that is the interaction and the energy deposed within the material is different from the energy deposition in human tissue. As this difference is, as described above, inter alia dependent from the energy of the gamma radiation, it is not sufficient to know the count rate and the overall energy deposed, but the energy of the single pulses has to be determined also. In order to determine the dose rate of such a detector with an inorganic scintillator, a correction function $Z(E_\gamma)$ has to be applied in addition in order to correct for the different interaction profile of the scintillator material used compared to human tissue.

In order to determine the energy of the interaction events measured, it is necessary to clearly distinguish the single scintillation pulses from each other. Once the count rate in such a spectroscopic detector increases beyond a certain level, the well-known effect of pulse pile-up increases, that is new events are triggered in the spectroscopic material before the light decay of the previous events has ended so that it becomes more difficult and, in the end, impossible to distinguish the different events from each other, not allowing for a measurement of the pulse energies. Such high pulse rates are usually in the order of 100.000 or more events per second in the scintillator.

In addition, the electric current output from the photo detector increases beyond acceptable values, namely beyond the maximum permissible mean output current, so that in PMT based detector systems the amplifier, respectively the PMT has to be switched off in order to prevent saturation and/or harming the amplifier through high currents. This maximum permissible mean output current cannot be exceeded. It is a property for any RDS. A simple reduction of the voltage applied to the amplifier, thereby reducing the amplification, does not solve the problem. This is not only because of the decreasing energy resolution but also because the pile-up problem is still an issue.

In practical applications, it is therefore either necessary to switch off the scintillator once the measured count rate and, in the consequence, the measured mean permissible output current, exceeds a certain level so that it is necessary to use an additional detector for the measurement of higher dose rates. In the prior art, this is usually a Geiger-Müller counter.

It is also known in the prior art to use organic scintillator materials like standard plastic scintillators, the absorption behavior of those materials being closer to those of human tissue. Such a standard plastic scintillator material does comprise atoms with fairly low Z so that the predominant nuclear interaction is no longer the photoeffect, i.e. the full absorption of the radiation energy in the material, but Compton scattering where only part of the radiation energy is deposed in the scintillation material. As a consequence, the determination of the overall radiation energy is much more difficult if not impossible, thus limiting the use of such materials in spectroscopic devices.

When using an organic material which is made in such a way that it is tissue equivalent with respect to the absorption of gamma radiation, the determination of the energy of the single events in the detector material not of such importance anymore as the absorption behavior is more similar to that of human tissue, but even in those cases, it would be an advantage if a correction could be applied. Such a set up with plastic scintillator material in the RDS would allow for a better determination of high dose rates for the price of a substantially worse energy resolution, thereby limiting the use of such a detector for spectroscopic applications.

SUMMARY

A purpose of this invention is to overcome these restrictions and to provide a method and a device for the measurement of high dose rates of ionizing radiation, namely gamma radiation, using any kind of scintillator material which is suitable for spectroscopic applications but without the need of additional detectors for the determination of high dose rates.

This problem is solved by a method and a device described in the claims. More specifically, it is solved by a method for determining the dose rate $\dot{H}$ of nuclear radiation, namely gamma radiation, with a radiation detection system (RDS), comprising a scintillator, a photodetector, an amplifier and a pulse measurement electronics, said pulse measurement electronics including a sampling analog to digital converter (ADC). The gamma radiation partly reacts with the scintillator, whereby the gamma quanta may for example be absorbed or scattered, thereby deposing all or at least some of their energy in the scintillator, thereby producing excited states in the scintillation material. Those excited states are decaying thereafter under emission of photons with a decay time $\tau$. Preferably, the scintillation material is selected in a way that its decay time $\tau$ is long enough to allow for a sampling by the ADC. The sampling period should be substantially shorter than the scintillation decay time. It should not exceed 50% of the scintillation decay time and should preferably be smaller than 5% of said decay time.

The emitted photons are then absorbed by the photodetector under emission of electrons, those electrons forming a current pulse, which is then amplified so that the resulting current signal can be processed further in order to determine the charge of the pulse measured, this charge of the pulse being proportional to the energy deposed in the scintillator by the nuclear radiation. The electrical amplifier output signal is coupled to the pulse measurement electronics either via AC- or DC-coupling.

The RDS has a defined maximum permissible mean output current for spectroscopic use, above which the voltage of the amplifier, defining the amplification of said amplifier, is reduced in order to prevent saturation and/or harming the amplifier through high currents. This maximum permissible mean output current is dependent from the type of amplifier used.

The claimed method comprises the step of reducing the bias voltage applied to the amplifier substantially when the maximum mean output current is exceeded. Reduction of said bias voltage leads to a reduction in amplification and therefore to a reduction of the value of mean output current. Said bias is reduced so that a current that is less than the maximum permissible mean output current flows during the measurement.

The measured detector output signal, being an analog signal, is digitized and differentiated by the pulse measurement electronics using a sampling period $\Delta$, thereby producing the current samples $i_\Delta$. As a next step, the variance of the sampled current signal, $\text{Var}(i_\Delta)$, is determined from the sampled current samples $i_\Delta$. In addition, the mean square difference of the sampled current signal $\text{Msd}(i_\Delta)$ is determined also, said mean square difference signal being a measure of the mean current.

Then, the mean Energy $E_\gamma$ is determined by using the equation $$E_\gamma = \frac{\text{Var}(i_\Delta)}{Msd(i_\Delta)}.$$

As the scintillator has a different behavior with respect to the absorption of gamma radiation energy than real tissue, a non-linear correction function $Z(\eta)$ has to be applied to said mean Energy $E_\gamma$, $\eta$ being a measure for the mean energy of each pulse. Said correction function does rectify the efficiency between the scintillator and a tissue equivalent ideal scintillator. Whereas scintillators comprising organic material, like plastic scintillators, are more similar to a tissue equivalent ideal scintillator, the use of inorganic scintillator material leads to larger differences so that the correction, which is, inter alia, a function of the energy of the absorbed gamma radiation as well as of the scintillator material and size, is even more important.

Finally, the energy compensated dose rate $\dot{H}$ is determined from current samples is by using the equation $\dot{H}=Z(E) \text{Msd}(i_\Delta)$.

The claimed method leads to even better results when the scintillator used comprises an inorganic scintillation material. It is also advantageous if the amplifier used is being selected from a group of Photomultiplier Tube (PMT) and Electron Multiplier.

It is also possible to use a RDS where the photodetector and the amplifier are combined in one device, selected from a group of Avalanche Photo Diode and Silicon Photomultiplier.

With the inventive method, the pulse measurement electronics can be coupled to the amplifier output via AC-coupling or via DC-coupling.

What is also claimed is a radiation detection system (RDS), comprising a scintillator, a photodetector, an amplifier and a pulse measurement electronics, said pulse measurement electronics including an analog to digital converter. As described above, the nuclear radiation deposes at least some of its energy in the scintillator, thereby producing excited states in the scintillation material, said excited states decaying thereafter under emission of photons with a decay time $\tau$. The photons are absorbed at least in part by the photodetector under emission of electrons, those electrons forming a current pulse, said current pulse being amplified so that the resulting current signal can be processed further in order to determine the charge of the pulse measured, this charge of the pulse being proportional to the energy deposed in the scintillator by the nuclear radiation. The electrical current signal is coupled to the pulse measurement electronics, whereas the RDS has a defined maximum permissible mean output current for spectroscopic use, above which the voltage of the amplifier, defining the amplification of said amplifier, is reduced in order to prevent saturation and/or harming the amplifier through high currents. According to the invention, this RDS is capable of performing a method according to the claims.

It is an advantage if the radiation detection system (RDS) makes use of a scintillator, said scintillator comprising an inorganic scintillation material. It is even more advantageous if the amplifier of the RDS is being selected from a group of Photomultiplier Tube (PMT) and Electron Multiplier.

The photodetector and the amplifier may also be combined in one device, which may be an Avalanche Photo Diode or a Silicon Photomultiplier.

The pulse measurement electronics may be coupled to the amplifier output via AC- or DC-coupling.

The inventor found out that it is no longer necessary to measure exactly the energy of single events of interaction between gamma radiation and the scintillator material as the application of statistical methods in combination with a digital signal processing, once having digitized the amplifier output signal with a sufficiently high sampling rate, i.e. with a sampling interval length being short against the light decay time $\tau$ of the scintillator material, such that the sampling interval would be maximally 50% of the scintillation decay time, preferably smaller than 5% of that decay time, provides sufficient information in order to obtain the dose rate $\dot{H}$.

BRIEF DESCRIPTION OF THE DRAWINGS

Similarly.

DETAILED DESCRIPTION

Figure 1:
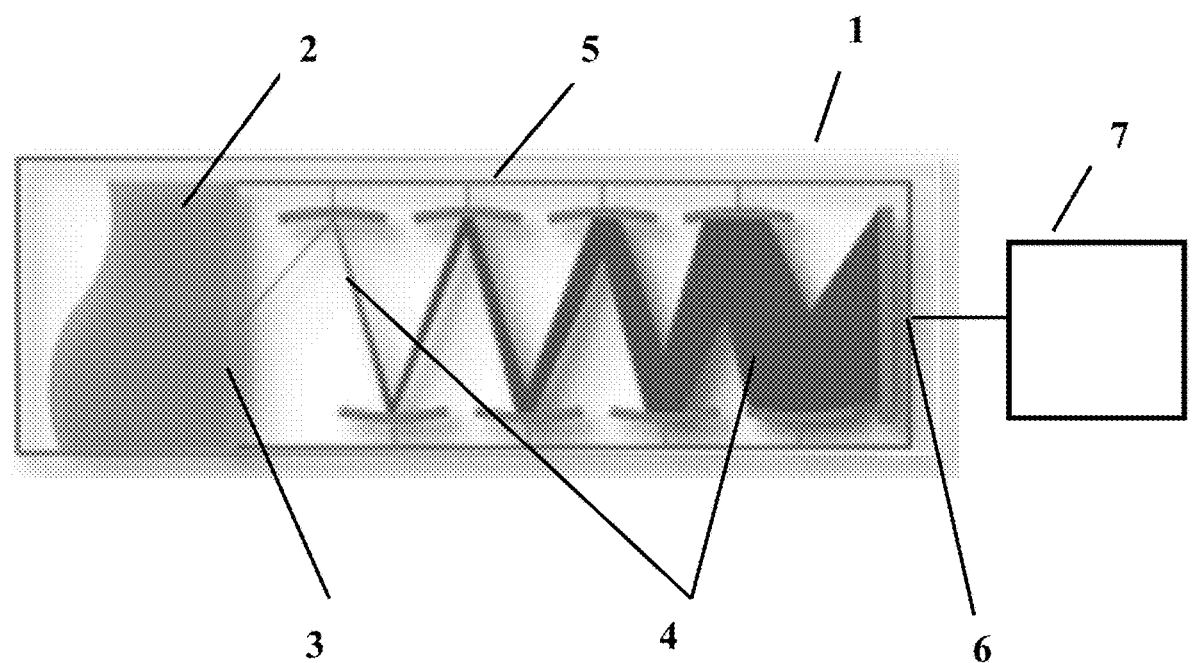
FIG. 1 shows a general setup of such an RDS 1. Gamma radiation is absorbed in the scintillator 2 under emissions of photons. Those are absorbed by the photodetector 3 under emission of electrons 4, which are then amplified by a PMT 5. The output signal from the anode 6 of the PMT is digitized with a high sampling rate and further evaluated by the attached measurement electronics 7.
Figure 2:
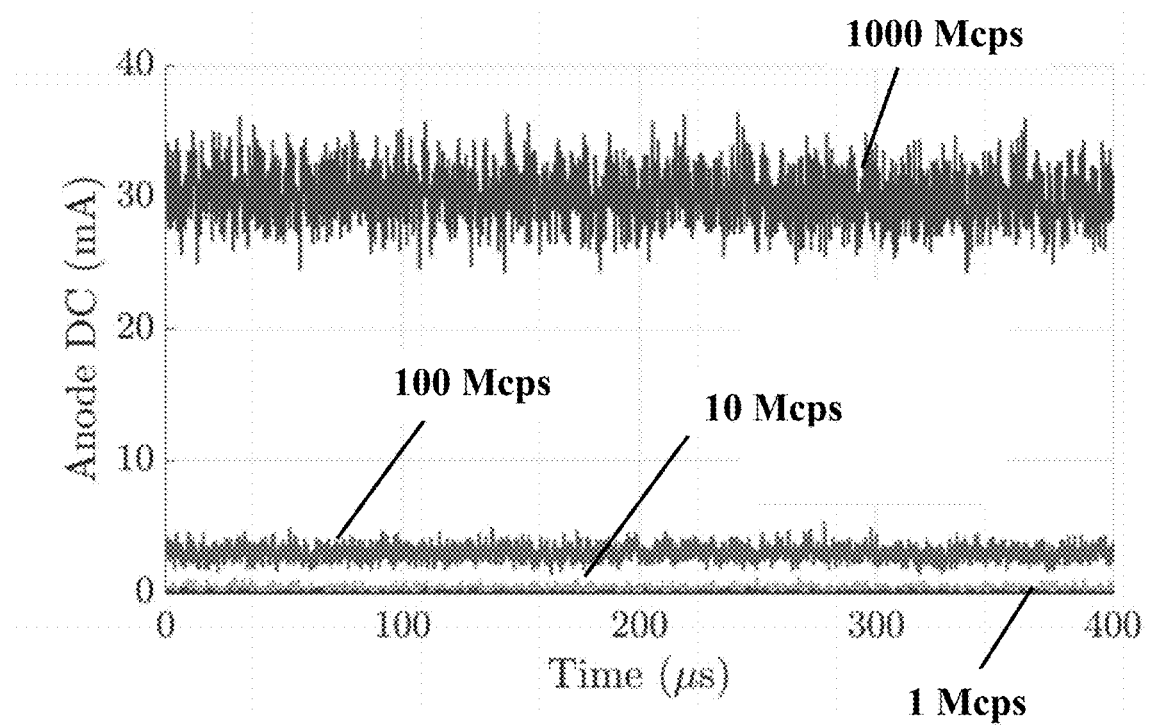
FIG. 2 shows a simulation of the mean current measured at the anode of a RDS with a PMT as amplifier, which is proportional to the count rate. In this setup, the measurement electronics is connected to said anode via DC-coupling. It can be seen that the current for a count rate of 1.000 Mcps (million counts per second) is much higher than the one for just 100 Mcps and that with 10 Mcps. The current measured for a count rate of just 1 Mcps can hardly be seen in the figure.
Figure 3:
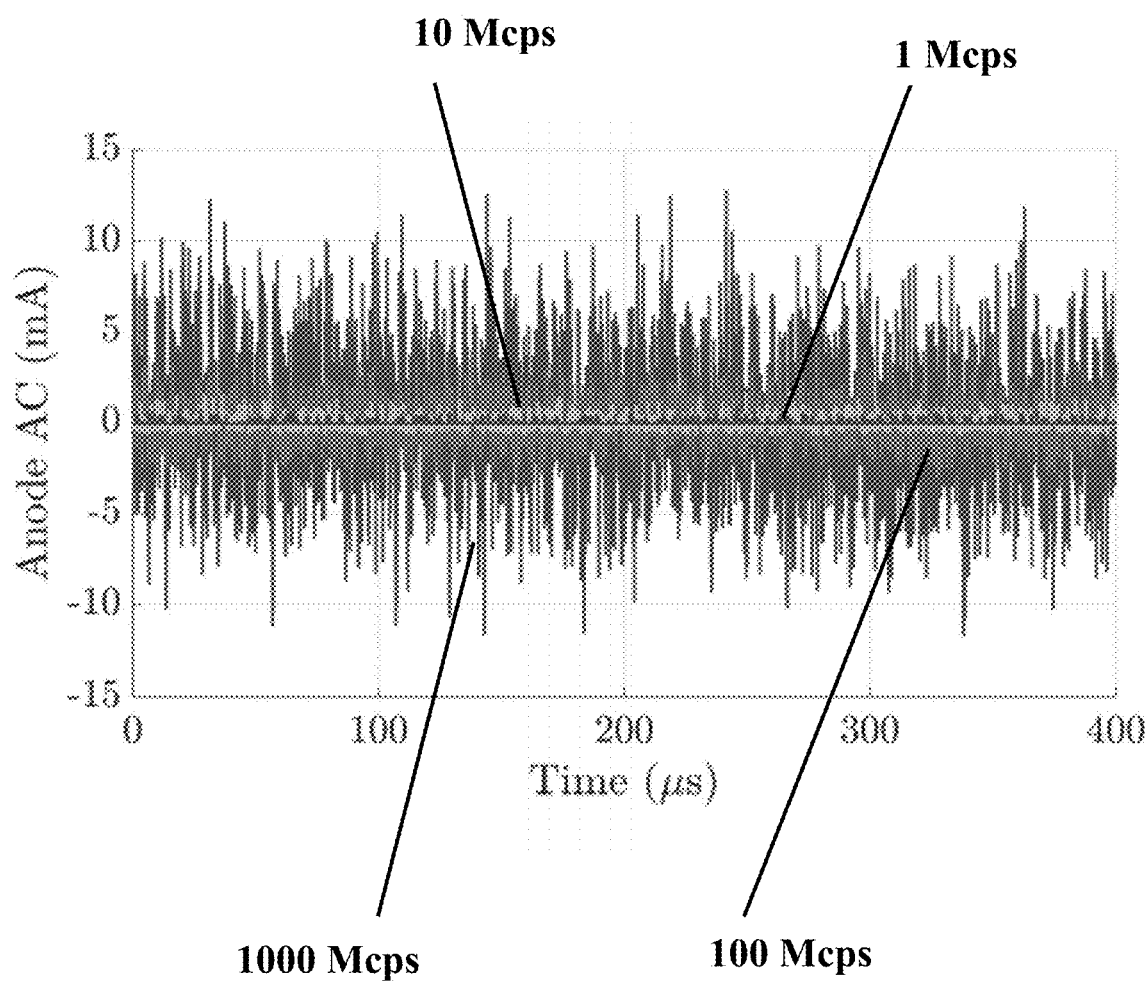
FIG. 3 shows an identical setup but with the measurement electronics coupled to the anode of the PMT via AC-coupling. When using AC coupling, the mean current is obviously zero. Nevertheless, the current fluctuation differs quite substantially, which can be seen again for count rates of 1.000, 100, 10 and 1 Mcps. Here, the dependence is not a linear one as the current fluctuation varies with the square root of the mean DC current.

When determining the dose rate $\dot{H}$ it is often sufficient to apply a non-linear correction function that depends on the mean measured energy, $Z(\eta)$, $\eta$ being a measure for the mean energy of each pulse. This function is sufficient to compensate the dose rate error of the mean current and should rectify the efficiency difference between a real detector and a tissue equivalent detector. As a consequence, the dose rate can be calculated as follows, $\lambda$ denoting the count rate:

$$\dot{H}=Z(\eta)\lambda\eta \tag{Eq. 1}$$

As the function $Z(\eta)$ is known or can at least be easily determined for each scintillator used in the RDS, two parameters need to be determined for the determination of the dose rate value: the mean energy of the radiation source and the mean current which can be calculated from the count rate and the mean energy of the pulses.

Further calculations show, that the mean square difference Msd of the sampled current signals $i_\Delta$ is a measure of the mean current:

$$\mathrm{Msd}(i_\Delta)=\lambda E(i_v)=\lambda\eta \tag{Eq. 2}$$

The mean energy $E_\gamma$ is retrieved by dividing the current variance $\mathrm{Var}(i_\Delta)$ by its mean square difference $\mathrm{Msd}(i_\Delta)$:

$$\eta \approx E_\gamma = \frac{\mathrm{Var}(i_\Delta)}{Msd(i_\Delta)} = \frac{E(i_v)^2 + \mathrm{Var}(i_v)}{E(i_v)} \tag{Eq. 3}$$

It follows, that the actual energy compensated dose rate can be determined from the measured and sampled current data $i_\Delta$ as follows:

$$\dot{H} = Z\left(\frac{\mathrm{Var}(i_\Delta)}{Msd(i_\Delta)}\right) Msd(i_\Delta) \tag{Eq. 4}$$

This method works with any kind of scintillator material, including inorganic scintillator crystals like NaI(Tl), CsI(Tl), CsI(Na), LaBr$_3$, CLYC, CLLB, CLLBC, CdWO$_3$, LYSO, NaI(Tl,$^6$Li), Gd$_3$Al$_2$Ga$_3$O$_{12}$, which are frequently used in spectrometers for identification of radionuclides. As a direct measurement of the pulse energies is not required, the method can also be used in all pulse pileup scenarios and with a reduced amplification of the photodetector—amplifier combination. It is therefore possible to determine high dose rates, that is dose rates which would lead to a shutdown of the amplifier of a RDS when operated according to methods known in the prior art due to high count rates.

As the method claimed allows the use of a standard RDS with a scintillator material, making use of high sampling rates, for the measurement of high dose rates, it is no longer necessary to provide an additional detector like a Geiger-Müller counter or an ionization chamber for this measurement. The setup of such detectors is easier therefore, reducing material, complexity and cost. This is of special advantage in portable radionuclide identification devices (RID), which have to be as simple and lightweight as possible in order to increase robustness and reliability apart from the reduction of costs.

What is claimed is:

1. A method for determining an energy compensated dose rate $\dot{H}$ of a nuclear radiation field comprising a gamma radiation field, in pulse pileup scenarios with a radiation detection system (RDS), comprising a scintillator, a photodetector, an amplifier and pulse measurement electronics, said pulse measurement electronics including an analog to digital converter, where the nuclear radiation deposits at least some of its energy in the scintillator, thereby producing excited states in the scintillation material, said excited states decaying thereafter under emission of photons with a decay time $\tau$, said photons being absorbed by the photodetector under emission of electrons, those electrons forming a current pulse, said current pulse being amplified by the amplifier so that the resulting current signal can be processed further in order to determine the charge of the pulse measured, this charge of the pulse being proportional to the energy deposited in the scintillator by the nuclear radiation, whereas the electrical signal is coupled to the pulse measurement electronics, whereas the RDS has a defined maximum permissible mean current for spectroscopic use, above which the voltage of the amplifier, defining the amplification of said amplifier, is reduced in order to prevent saturation and/or harming the amplifier through high currents, wherein the method comprises the following steps:

when the maximum permissible mean current is exceeded, reducing the bias voltage applied to the amplifier, so that a current that is less than the maximum permissible mean current flows during the measurement;

digitizing and differentiating the analog detector output current signal $i_v$ measured by the pulse measurement electronics using a sampling period $\Delta$, producing the current samples $i_\Delta$;

determining the variance of the sampled current signal $Var(i_\Delta)$;

determining the mean square difference of the sampled current signal, $Msd(i_\Delta)$, being a measure of the average current;

determining the mean Energy $E_\gamma$ by using the equation $$E_\gamma = \frac{Var(i_\Delta)}{Msd(i_\Delta)}$$

applying a non-linear correction function $Z(E_\gamma)$ to said mean Energy $E_\gamma$, said correction function rectifying the efficiency between the scintillator and a tissue equivalent ideal scintillator by accounting for a different energy deposition within the scintillator compared to human tissue, determining the energy compensated dose rate H from current samples $i_\Delta$ by using the equation $\dot{H}=Z(E_\gamma) Msd(i_\Delta)$.

2. The method of claim 1, the scintillator used comprising an inorganic scintillation material.

3. The method of claim 1, the amplifier used being selected from a group of Photomultiplier Tube (PMT) and Electron Multiplier.

4. The method of claim 1 using a RDS where the photodetector and the amplifier are combined in one device, selected from a group of Avalanche Photo Diode and Silicon Photomultiplier.

5. The method of claim 1, whereby the pulse measurement electronics is coupled to the amplifier output via AC-coupling.

6. The method of claim 1, whereby the pulse measurement electronics is coupled to the amplifier output via DC-coupling.

7. A radiation detection system (RDS), comprising a scintillator, a photodetector, an amplifier and a pulse measurement electronics, said pulse measurement electronics including an analog to digital converter, where the nuclear radiation deposits at least some of its energy in the scintillator, thereby producing excited states in the scintillation material, said excited states decaying thereafter under emission of photons with a decay time $\tau$, said photons being absorbed by the photodetector under emission of electrons, those electrons forming a current pulse, said current pulse being amplified so that the resulting current signal can be processed further in order to determine the charge of the pulse measured, this charge of the pulse being proportional to the energy deposited in the scintillator by the nuclear radiation, whereas the electrical signal is coupled to the pulse measurement electronics, whereas the RDS has a defined maximum permissible mean current for spectroscopic use, above which the voltage of the amplifier, defining the amplification of said amplifier, is reduced in order to prevent saturation and/or harming the amplifier through high currents, wherein the RDS is capable of performing a method according to claim 1.

8. The radiation detection system (RDS) of claim 7 wherein the scintillator comprises an inorganic scintillation material.

9. The radiation detection system (RDS) of claim 7, wherein the amplifier is selected from a group of Photomultiplier Tube (PMT) and Electron Multiplier.

10. The radiation detection system (RDS) of claim 7, wherein the photodetector and the amplifier are combined in one device, selected from a group of Avalanche Photo Diode and Silicon Photomultiplier.

11. The radiation detection system (RDS) of claim 7, wherein the pulse measurement electronics is coupled to the amplifier output via AC-coupling.

12. The radiation detection system (RDS) of claim 7, wherein the pulse measurement electronics is coupled to the amplifier output via DC-coupling.

\* \* \* \* \*